March 17, 1942.     S. J. E. ASKLUND     2,276,279
RADIATOR CONTROL FOR MOTOR VEHICLES Filed May 11, 1940     4 Sheets-Sheet 1

Inventor:
Sven Johan Eugen Asklund.
By
Attorney.

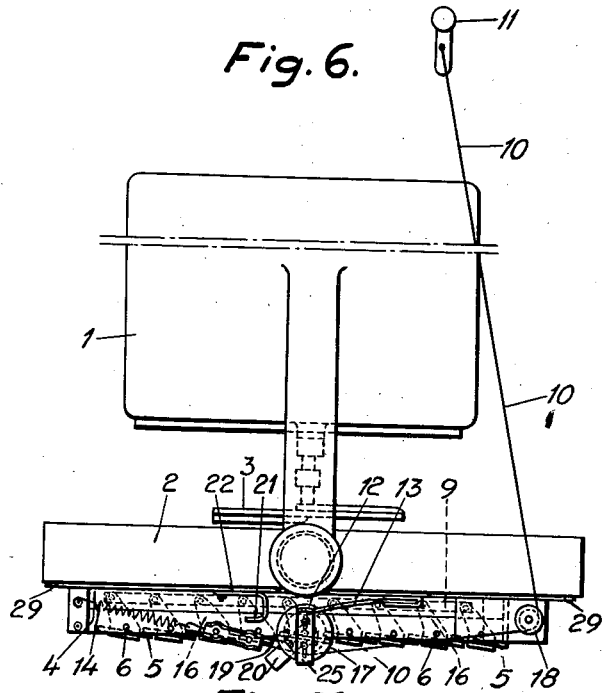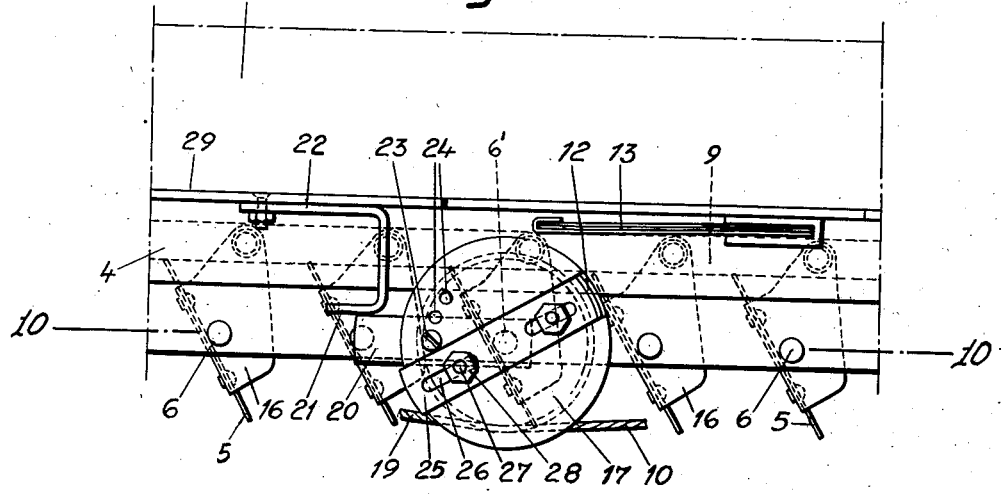

March 17, 1942. S. J. E. ASKLUND 2,276,279
RADIATOR CONTROL FOR MOTOR VEHICLES
Filed May 11, 1940 4 Sheets-Sheet 4

Inventor
Sven J. E. Asklund
by E. Freeman
Atty.

Patented Mar. 17, 1942

2,276,279

UNITED STATES PATENT OFFICE 2,276,279

RADIATOR CONTROL FOR MOTOR VEHICLES

Sven Johan Eugen Asklund, Lidingo, Sweden

Application May 11, 1940, Serial No. 334,548
In Sweden May 9, 1939

10 Claims. (Cl. 123—174)

This invention relates to improvements in radiator control for motor vehicles. A special object of the invention is to obtain an improved control of the movements of the protector.

It is well known that the maintenance of a determined optimum temperature of the cooling water in an internal combustion engine is of the greatest importance for the durability as well as for the efficiency of the engine.

For such purpose a radiator control has been provided, which may consist of a curtain or, which is more common, of a shutter provided with a number of louvers. Said louvers can be opened and closed for the purpose of controlling the quantity of air which is allowed to pass through the radiator. It has already been proposed to control the adjustment of the louvers by means of a thermostat in accordance with the temperature of the water in the radiator. This arrangement involves the drawback that the protector is not closed until the temperature of the water has considerably lowered.

It is an object of this invention to provide for an automatic opening of the control, when the vehicle is started, and an automatic closing, when the vehicle stops and the brakes are applied. For this purpose the control is in operative connection with the brake operating means.

Another object of this invention is to combine the above operating device with a thermostat, which, when the vehicle is started, does not allow the opening of the control until the temperature of the cooling water has reached the optimum.

These objects as well as others are described more in detail in the following specification, reference being had therein to the accompanying drawings, which show some embodiments of the device according to the invention, and in which Figure 1 is a diagrammatic side view of a portion of an automobile, the radiator of which is provided with control means according to the invention, the louvers in this embodiment being horizontal. The brake lever is shown in two positions and the control in closed position. Certain portions are broken away.

Figures 6–9 show another embodiment according to which the control device is provided on the top of the control, the latter having in this case vertical louvers.

Figure 6 is a plan view of a portion of an engine with radiator and control, the louvers being closed.

Figure 7 is a partial plan view of a portion of the control with the control device and with the louvers in open position.

Figure 8 is a front view of the same portion as is shown in Figure 7.

Figure 9 is a diagrammatical partial side view of the front portion of an automobile with the lower portions removed provided with radiator control and a control device according to Figures 6–8.

The same reference characters will be used to designate the same parts throughout the different views.

Figure 2:
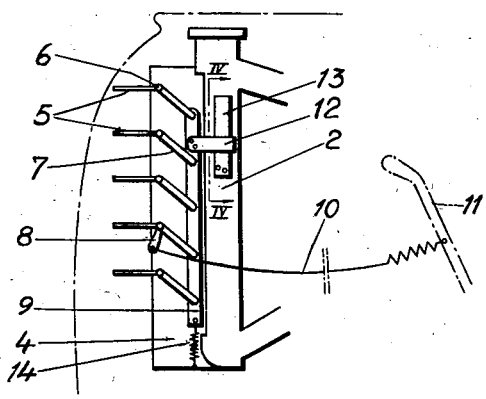
Figure 2 shows the same view as Figure 1, further portions, however, being cut away and the brake lever and the protector being shown in open positions.
Figures 3, 4:
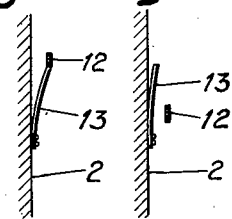
Figures 3 and 4 are sections taken on lines III—III of Figure 1 and IV—IV of Figure 2, respectively and show the thermostat, which has the form of a bimetal spring, in two positions.
Figure 5:
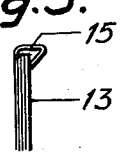
Figure 5 shows on a larger scale one embodiment of the upper portion of the bimetal spring.

Reference character 1 designates the engine, 2 the radiator and 3 the fan. Immediately in front of the radiator there is provided a frame 4 with vertical side walls, said frame being attached to the radiator in a suitable manner. The control comprises according to Figures 1 and 2 a number of louvers 5 horizontally mounted on pins 6 in the side walls 4 of the frame, each of said pins being pivotally mounted in the side walls 4 and on one side rigidly connected with a control arm 7. On one or on both sides the arms 7 are movably connected to a vertically displaceable rod 9. The lower end of this rod is actuated by a spring 14 fixed to the frame, said spring tending to pull down the rod so as to turn the louvers to open position. To one of the pins 6 is also attached a lever 8, which is connected to the brake lever 11 by means of a cable or a wire 10. Instead hereof there might be used an electromagnetic, pneumatic or hydraulic power transmission device. From the upper portion of the rod 9 an arm 12 extends rearwardly outside the radiator 2. An upwardly directed thermostat 13 is secured to the radiator, said thermostat in the shown embodiment consisting of a bimetal spring, which is so positioned that the same, when relatively cold and bent outwardly from the radiator, with its upper end forms a support for the arm 12, see especially Figure 3. The bimetal thermostat 13 preferably consists of a number, in the embodiment shown five, of spring leaves placed tightly together and held together in a suitable manner, preferably as shown in Figure 5. According to this figure the upper end of one side leaf has an extension 15, which has been bent over the other leaves and inwards towards the opposite side leaf, an advantageous supporting surface for the arm 12 and a simple, comfortable and reliable member for holding the spring leaves together being thereby formed. The outside of the bimetal thermostat may be isolated to prevent radiation.

Figure 1:
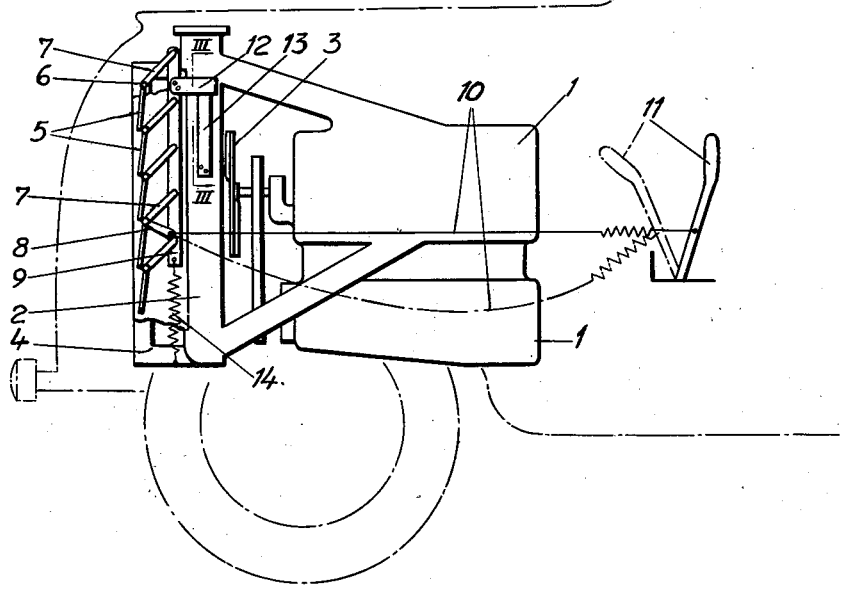

When the brake lever 11 is in its braking position the louvers 5 assume vertical positions, an unbroken surface covering the front side of the radiator being thus formed, see Figure 1. When the brake lever is released, i. e. moved forward, the spring 14 tends to lower the rod 9 so as to open the protector. In this position, however, the arm 12 bears against the thermostat, provided that the radiator (the engine) is cold or that the temperature of the cooling water has not reached the optimum, Figures 2 and 3, the coefficient of expansion of the thermostat being so chosen that the thermostat does not bend until the temperature has reached this optimum. Consequently, when the radiator has got hot, i. e., when the cooling water has reached the optimum or working temperature, the thermostat bends towards the radiator, thereby releasing the arm 12, see Figures 2 and 4, so that the spring 14 will be able to lower the rod 9 and, thus, open the protector. When necessary, the extent to which the louvers can be opened may be varied as described hereinafter. When the brake lever at the stopping of the vehicle is moved to braking position the louvers are again turned to closed position. As soon as the water temperature lowers beneath the optimum the thermostat 13 starts bending outwards until its upper end assumes the position beneath the arm 12 in which it again prevents an opening of the protector, even if the brake lever is released.

Figure 8:
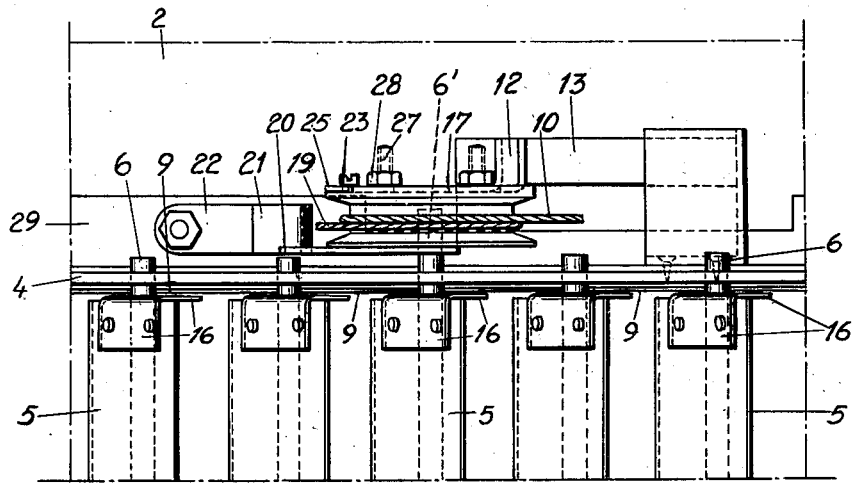
Figure 9:
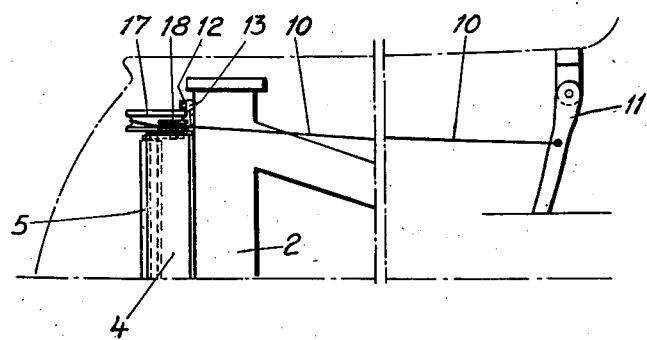
Figure 10:
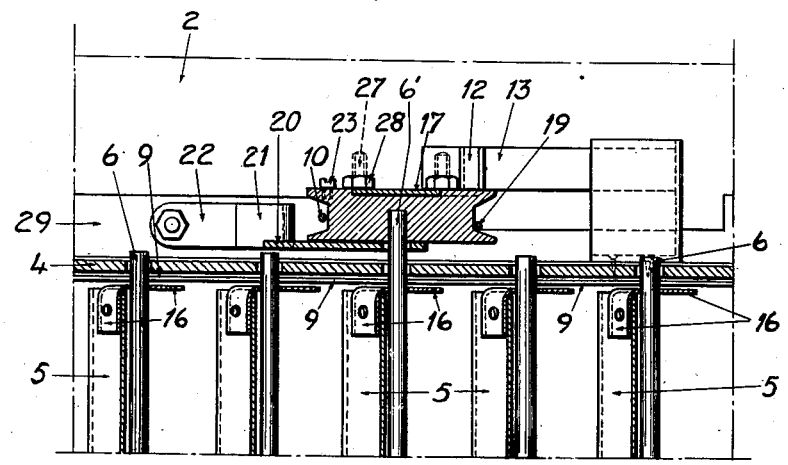
Fig. 10 is a section on enlarged scale taken along the line 10—10 of Fig. 7.

Figures 6–8 show a particularly advantageous embodiment of the control device. The rectangular frame 4 consists of a metal piece the inside of which is preferably covered by a frame of Bakelite. The inner edge of the frame 4 has a bent out flange 29 by means of which the frame is fixed to the radiator. In this case the louvers 5 are vertically mounted on the pins 6 in the frame 4 and, as shown, in the Bakelite covering. The louvers may consist of metal or, that which is also advantageous, of Bakelite. At each end the louvers 5 are articulated to a rod 9 by means of angularly bent portions 16 mounted on the pins 6, said rod 9 being provided between the upper and lower ends of the frame and adapted to be reciprocated. Simultaneously with the reciprocating motion the rod 9 also performs a slight swinging motion. One of the upper pins 6, preferably one in the middle of the frame, has an extension 6' outside the frame. On this extension is rigidly secured a cable roller 17, to which the cable or wire 10 connected to the brake lever 11 via a roller 18 secured to one corner of the frame is fixed in such manner that the roller 17 upon actuation of the brake lever when moved in braking position can be rotated so as to close the protector, said actuation being transmitted by the cable 10. The pin extension 6' and the pin 6 is hereby turned so that the whole louver system is actuated. To that corner of the frame 4 which is opposite to the roller 18 there is attached a draw spring 14, to which one part 19 of the cable is connected in such a manner that the spring strives to rotate the roller 17 so as to open the protector. For limiting the opening motion of the protector one end of a plate 20 is turnably mounted on the pin extension 6' beneath the roller 17, the other end of said plate extending outside the roller and being adapted to cooperate with an arm 21 on an angle iron 22 fixed to the flange portion of the frame. Said plate can be adjusted into various angle positions by means of a screw 23 passing through apertures 24 in the cable roller 17.

The thermostat 13 is attached to the upper portion of the radiator substantially horizontally so that it is subjected to the action of the water temperature in the upper container of the radiator, a higher effect being thereby obtained. A cut-out for the thermostat has been made in the flange 29. The arm or shoulder 12 cooperating with the thermostat 13 is provided on the outside of the roller 17, said arm or shoulder in this embodiment projecting upwardly from one end of a plate 25 provided in a groove made in the upper surface of the roller 17. This plate is provided with slots 26 engaged by screw-taps 27 for nuts 28 so as to allow an adjustment of the plate in various positions for the purpose of obtaining the desired relation to the upper end of the thermostat 13.

The mode of operation of this device is fundamentally analogous to that described before. Thus, the thermostat, when cold, is slightly bent outwards (Figure 6) so as to prevent a downward motion of the arm 12 and, when warm, about parallel to the radiator, so that an opening of the control may freely take place.

The device according to the invention involves inter alia the following advantages. The control can be placed between the stone guard and the radiator, the operation of the control does not require any attention from the driver, and the control is closed instantly the moment the car is stopped and is not opened until the cooling water has reached the working temperature. The thermostat may be of the simplest kind and of little strength, the purpose of the same being only to release the force produced at the braking.

A great reliability is obtained by means of the simple devices.

Having now described my invention, what I claim as new and desire to secure by Letters Patent is:

1. In a control device for a motor-car radiator control, which control is adapted to be attached to the radiator and provided with movable means for covering or uncovering the radiator, means for actuating these movable means, a brake operating means, the actuating means for the control being in operative connection with the brake operating means for opening and closing the control when starting and stopping the car, a thermostat located close to the radiator near the control, said thermostat consisting of a bi-metal spring extending from the radiator, a release means for allowing the control to move to open position, a member movable substantially in dependence upon the motion of the control, a control member projecting from said member and adapted to bear against the free end of the thermostat for the purpose of retaining the control in closed position, the thermostat, when the cooling water has reached its optimum temperature being adapted to bend away from the control member for enabling the opening of the control.

2. A control device for a motor-car radiator control as claimed in claim 1, in which the control is provided with a frame adapted to be attached to the radiator and with a plurality of louvers, said louvers being turnably mounted in the frame and adapted to be opened and closed, means comprising a rod uniting the ends of the louvers being located inside the turning points at least on one side, from which rod an arm projects, said arm being adapted to bear against the thermostat for the purpose of preventing the opening of the control before the temperature of the cooling water has reached the desired optimum.

3. A control device for a motor-car radiator control as claimed in claim 1, in which the bimetal thermostat is formed by a number of united spring leaves, the free ends of said leaves forming a supporting surface for the control member for the control.

4. A control device for a motor-car radiator control as claimed in claim 1, in which the bimetal thermostat is formed by a number of united spring leaves, the free ends of said leaves forming a supporting surface for the control member for the control, one of the outer spring leaves having an extension, said extension being bent over the free ends of the other leaves and inwards towards the outer surface of the opposite outer spring leaf.

5. In a control device for a motor-car radiator control, which control is adapted to be attached to the radiator and has a plurality of louvers turnably mounted on pins in the upper and lower sides of the control and adapted to be opened and closed, means for preventing the control from being opened when the temperature is below a determined value, said means consisting of a bimetal thermostat located close to the radiator and extending substantially parallel to the radiator when the temperature is at the optimum an arm projecting from a movable member on the control and adapted to bear against the thermostat, when the temperature is below the determined value, the thermostat at this temperature being bent outwards from the radiator, said movable member consisting of a roller fixed to a portion projecting from the upper end of one of the pins for the louvers, a brake operating means, a cable connecting the roller and the brake operating means for the purpose of closing the louvers when braking, spring means on the upper side of the control united with the roller for opening the louvers when the brake operating means are released, and means for adjusting the extent to which the louvers can be opened.

6. In a control device for a motor car radiator control, said control having the shape of a turned-over roller blind and adapted to be attached to the radiator, means for actuating said blind, a brake operating means, the means for actuating said blind being in operative connection with the brake operating means for opening and closing said control when starting and stopping the car, a thermostat for controlling the opening and closing of said blind in accordance with the temperature of the cooling water in the radiator, said thermostat being located close to the radiator near said blind and consisting of a bimetal spring extending from the radiator, a release means for allowing said blind to move to open position, a member movable substantially in dependence upon the motion of said blind, a control member projecting from said member and adapted to bear against the free end of said thermostat for retaining said blind in its closed position, said thermostat, when the cooling water has reached its optimum temperature, being adapted to bend away from said control member for enabling the opening of said blind.

7. In a control device for a motor car radiator control, said control being adapted to be attached to the radiator and including movable means for alternatively covering and uncovering the radiator; a first mechanism for actuating said movable means including a brake operating means, said brake operating means being operatively connected with said movable means for opening and closing the control when starting and stopping the car; a device for urging said movable means into its open position; and a second mechanism independent from said first mechanism for alternatively locking and releasing said movable means in dependence upon the temperature of the radiator including a rod shaped thermostat secured to the radiator and adapted to bend away from its normal position when a predetermined optimum temperature is reached, a support on said movable means adapted to be normally supported by said thermostat for locking said movable means and for preventing the opening of the control, said thermostat being adapted to be released from said support for allowing said device to open the control when the temperature of the cooling water has reached its optimum.

8. In a control device for a motor car radiator control, said control being adapted to be attached to the radiator and including movable means for alternatively covering and uncovering the radiator; a first mechanism for actuating said movable means including a brake operating means, said brake operating means being operatively connected with said movable means for opening and closing the control when starting and stopping the car; spring means for urging said movable means into its open position; and a second mechanism independent from said first mechanism for alternatively locking and releasing said movable means in dependence upon the temperature of the radiator including a bimetallic spring secured to the radiator and designed to bend when a predetermined optimum temperature is reached, a support on said movable means adapted to be normally supported by said spring for locking said movable means and for preventing the opening of the control, said bimetallic spring being adapted to be released from said support for allowing opening of the control when the temperature of the cooling water has reached its optimum.

9. A control device for a radiator control as claimed in claim 6 in which the roller on its upper side has a plate, said plate being adjustable in its longitudinal direction and provided at one end with an upwardly extending portion, said portion forming the arm adapted to cooperate with the thermostat.

10. A control device for a radiator control as claimed in claim 6 in which the means for adjusting the extent to which the louvers can be opened consists of a member turnably mounted on the lower side of the roller and having a portion projecting outside the circumference of the roller and adapted to be adjusted into various positions by means of a fastening means, said fastening means being adapted to engage one of a number of apertures in the roller, a shoulder for cooperation with the projecting portion of said member being provided on the upper side of the protector.

SVEN JOHAN EUGEN ASKLUND.